(12) United States Patent
Amirzadeh-Asl et al.

(10) Patent No.: US 7,501,110 B2
(45) Date of Patent: Mar. 10, 2009

(54) PROCESS FOR PRODUCING BARIUM SULFATE, BARIUM SULFATE AND USE THEREOF

(75) Inventors: Djamschid Amirzadeh-Asl, Moers (DE); Jürgen Bäuml, Kamp-Lintfort (DE); Udo Selter, Moers (DE)

(73) Assignee: Sachtleben Chemie GmbH, Duisburg (DE)

( * ) Notice: Subject to any disclaimer, the term of this patent is extended or adjusted under 35 U.S.C. 154(b) by 694 days.

(21) Appl. No.: 11/077,775

(22) Filed: Mar. 11, 2005

(65) Prior Publication Data
US 2005/0180912 A1 Aug. 18, 2005

Related U.S. Application Data

(63) Continuation of application No. 10/009,099, filed as application No. PCT/EP00/02872 on Mar. 31, 2000, now abandoned.

(30) Foreign Application Priority Data
Jun. 9, 1999 (GE) ................. 199 26 216

(51) Int. Cl.
C01F 5/42 (2006.01)
(52) U.S. Cl. ........................ 423/544; 423/160; 423/161; 423/166
(58) Field of Classification Search ................. 423/160, 423/161, 166, 554
See application file for complete search history.

(56) References Cited

U.S. PATENT DOCUMENTS 4,894,093 A   1/1990   Aberhold

FOREIGN PATENT DOCUMENTS

EP   371530   *   6/1990
EP   687651   *   12/1995

* cited by examiner

Primary Examiner—Steven Bos
(74) Attorney, Agent, or Firm—Fulbright & Jaworski L.L.P

(57) ABSTRACT

This patent describes the use of barium sulfate as filler for thermosetting and thermoplastic plastics, elastomers, sealants, adhesives, fillers, varnishes, paints, paper, glass and as substrate for colored pigment formulations as well as for single-layer or multilayer coatings consisting of metal oxides, metal oxide mixtures and/or metal compounds, as a nucleus of crystallization for lead sulfate in the negative electrode paste of lead accumulators and as an X-ray contrast medium, the barium sulfate being produced by a continuous process wherein a barium salt solution and a sulfate solution are simultaneously and continuously brought together in equimolar quantities in a precipitating suspension at a temperature of 30 to 90° C., with constant stirring, the precipitating suspension is withdrawn continuously in a steady volume and the barium sulfate precipitate is filtered, washed and optionally dried, wherein the barium salt solution has a concentration of 0.1 to 0.8 $Ba^{2+}$ mol/l and the sulfuric acid has a concentration of 0.1 to 2.0 $SO_4^{2-}$ mol/l, and the flow rate and stirring speed are controlled, at a constant precipitation volume, in such a way that a pH value of 1 to 5 is obtained in the precipitating suspension, and the lamellar barium sulfate particles produced as result of the precipitation are 0.1 to 50 μm wide, 0.1 to 50 μm long and 0.1 to 2 μm thick and the needle-shaped particles produced as result of the precipitation are 1 to 50 μm long and 0.1 to 2 μm thick, the ratio of length or width to the thickness being 3:1 to 500:1.

9 Claims, 3 Drawing Sheets

PROCESS FOR PRODUCING BARIUM SULFATE, BARIUM SULFATE AND USE THEREOF

Figure 1:
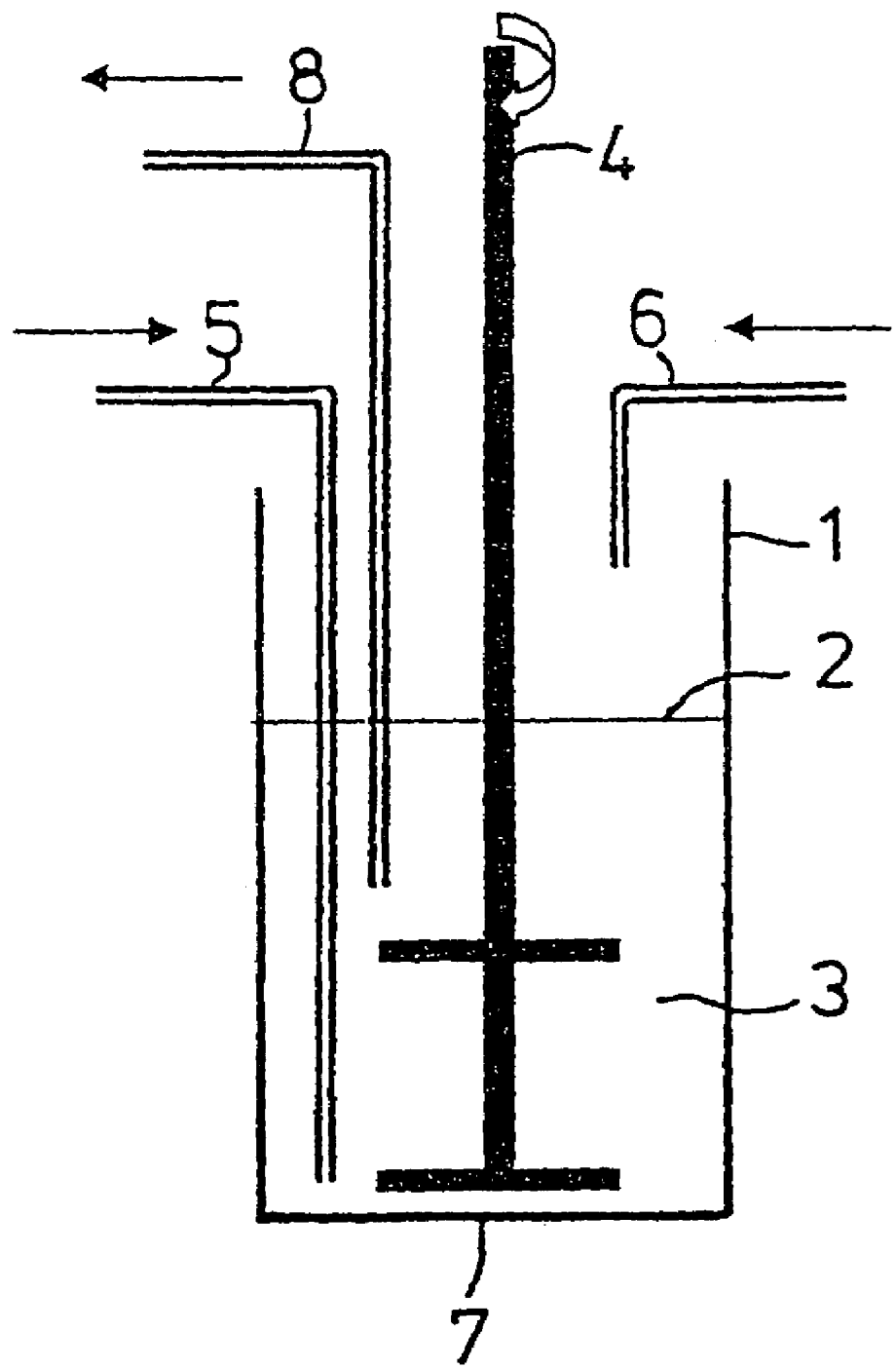

This application is a continuation application of U.S. Ser. No: 10/009,099 filed Mar. 14, 2002 now abandoned, which is a §371 of PCT/EP00/02872 filed Mar. 31, 2000, which claims priority from German Patent Application No: 199 26 216.0 filed Jun. 9, 1999.

This invention relates to a process for the continuous production of barium sulfate consisting of microcrystalline particles produced by precipitation, wherein a barium salt solution and a sulfate solution are simultaneously and continuously brought together in equimolar quantities at a temperature of 30 to 90° C., with constant stirring, the precipitating suspension is withdrawn continuously in a steady volume and the barium sulfate precipitate is filtered, washed and optionally dried.

Barium sulfate is precipitated out very rapidly, and consequently in finely divided state, as a sparingly soluble substance when solutions containing $Ba^{2+}$ and $SO_4^{2-}$ ions are brought together. The particle size can be influenced by controlling the nucleation rate and growth rate, for example, by varying the concentration, temperature and stirring speed. The precipitating agent is also influential in that, under otherwise identical precipitation conditions, a coarser barium sulfate precipitate is obtained by using free sulfuric acid than by using neutral sulfates (Ullmann, Second Edition, Volume 2, page 119).

Discontinuous precipitation, in which one component is placed in the precipitation vessel, is to be distinguished from continuous precipitation, in which both components of the precipitation reaction are introduced simultaneously into a precipitation vessel equipped with overflow or bottom outlet. As is generally known, the continuous process is technically and economically superior to the discontinuously operated process.

DE-A-2 246 818 discloses a continuous process for producing microcrystalline barium sulfate powder having an average particle size $d_{50}$ of 0.01 to 20 μm. In this process, equimolar quantities of $Ba^{2+}$ and $SO_4^{2-}$ ions and 0.1 to 2% barium sulfate nuclei (based on barium sulfate passed through) are fed simultaneously and continuously into a precipitation vessel at a temperature of between 50° C. and 80° C., with slow stirring, and flow rate and stirring speed are controlled at a constant precipitation volume, with the provision that the barium sulfate particles of the target particle size form sediment in the outlet of the precipitation vessel and the small barium sulfate particles remain in the upper zone of the precipitation vessel. The barium sulfate precipitate is then filtered, washed, dried and ground.

The barium sulfate powder thus produced, which is referred to as "Blanc fixe" powder, has an average particle size $d_{50}$ of 0.01 to 20 μm; the individual particles are spherical in finely divided products and cubiform in coarse products.

EP-B 0 445 785 describes a process for producing barium sulfate having a lamellar crystal morphology, in which the diameter-height ratio is 5 to 100 μm and the ratio of the square of the circumference of the lamella to the surface area of the orthogonal production plane is 20:1 to 150:1. The crystal morphology is butterfly-shaped with one or two planes of symmetry vertical to the lamellar plane and with a concave part disposed around its circumference. A starting material consisting of a solution of a barium salt having a barium ion concentration of 0.001 to 0.05 mol/l is added dropwise at a pH value of 1.0 to 5.0 and at a temperature of 50 to 100° C., in a ratio of 1:10 to 5:1, to a solution of a sulfate having a sulfate ion concentration of 0.01 to 0.05 mol/l. Starting materials used include sodium sulfate, barium nitrate, barium chloride, barium hydroxide, barium acetate. The barium sulfate produced in this way is reported to have high transparency and low coefficients of friction. The disadvantages of this barium sulfate, which is produced by the discontinuous method, are that the low concentrations of barium ions and of sulfate ions in the starting solutions result in a very low content of barium sulfate in the precipitating suspension, with the consequence that the throughput is low and hence the production involves considerable expense. Incidentally, the surfaces of the barium sulfate particles are uneven.

The object of the present invention is to organise the procedures described above in such a way that barium sulfate containing particles in the form of lamellae and/or needles having a defined size and even surfaces can be produced on the large scale with as little expense as possible.

This object is achieved by the combination of features set out in claim 1.

Preferred developments of these features are given in claims 2 to 5.

The lamellar particles of the barium sulfate are according to the invention 1 to 50 μm wide, 1 to 50 μm long and 0.1 to 2 μm thick and the needle-shaped particles are 0.1 to 50 μm long and 0.1 to 2 μm thick, the ratio of length or width to the thickness being 3:1 to 500:1.

As the barium sulfate has a very low binder requirement accompanied by excellent dispersibility and possesses a low specific surface, it is usable in almost all lacquers and emulsion paints. High-gloss coatings which are resistant to flocculation in combination with other pigments can be produced. The barium sulfate exhibits a very high light reflectance in the visible region and the UV and IR region of the spectrum, so that it maintains the original brilliance and the hue of the coloured pigments used. Because of the high purity, the barium sulfate can be used in the necessary materials and coatings which come into contact with food.

The barium sulfate according to the invention is acid-and alkali-resistant, insoluble in water and in organic media and, used as an inert filler, is lightfast and weather-resistant. These properties render the barium sulfate suitable for numerous applications, as set out in claim 7.

The barium sulfate can be dispersed exceptionally well in all plastics and increases their hardness and rigidity without impairing the toughness and the surface quality. In addition, it results in a distinctly higher X-ray opacity, for example, for medical articles and toys. Moreover, the barium sulfate according to the invention is suitable for producing semiopaque colourings, for example, for lamp coverings.

Natural substrates such as mica, talc, bentonite, kaolin, et cetera are used for producing special pigments, such as pearl gloss pigments, anticorrosive pigments, conductive pigments and catalysts. In this connection, for example, mica is used as substrate in the production of pearl gloss pigments for use in cosmetics, varnishes and paints and plastics. A disadvantage of these natural raw materials is that these cannot, like conventional pigments, be dispersed by the action of high gravitational forces, as this results in a destruction of the lamellar structure. The barium sulfate lamellae according to the invention have excellent stability, however, and can be used both as substrate and directly, where high stability of the lamellar form is required. Another advantage over the natural raw materials, when used as filler, is the extremely high purity.

The invention is explained in more detail below by means of some Examples.

Figure 2:
Figure 3:

FIG. 1 shows a diagrammatic transverse section through a precipitation reactor for the preparation of a barium sulfate precipitating suspension, FIG. 2 shows a scanning-electron micrograph of lamellar barium sulfate particles, FIG. 3 shows a scanning-electron micrograph of lamellar barium sulfate particles.

FIRST EXAMPLE 3.6 l/h of $Ba(OH)_2$ solution having an ion concentration of 0.3 $Ba^{2-}$ mol/l is introduced at a temperature of 50° C. through a pipe (5) and 0.7 l/h dilute sulfuric acid containing 1.5 $SO_4^{2-}$ mol/l is introduced through a pipe (6), continuously and simultaneously at constant volume, by means of metering pumps (not shown), into a tank (1) having a capacity of 5 l (diameter 160 mm, height 270 mm), in which the precipitation surface (2) of the precipitating suspension (3) is maintained at 80% of the capacity, with the stirrer (4) operating at constant speed. The dilute sulfuric acid is metered onto the surface (2) of the precipitating suspension (3), while the $Ba(OH)_2$ solution is introduced slightly above the base (7) of the tank (1). Through the controlled addition of the starting solutions, the precipitation is regulated in such a way that the pH value of the precipitating suspension is consistently 3 to 3.5. The residence time is 56 min at a precipitation temperature of 40 to 45° C. The precipitating suspension, which contains approximately 60 g $BaSO_4$/l, is continually withdrawn at constant volume from the tank via a pipe (8) at a level of 140 mm. In adjustment tanks (not shown) the precipitating suspension (3) is adjusted to a final pH value of 4 by the addition of $Ba(OH)_2$ solution; this is important for subsequent processing. The electrical conductivity of the barium sulfate produced in this way is approximately 110 µS/cm at the pH value of 4. The precipitating suspension (3) is filtered through a porcelain nutsch and washed. After having been dried at 110° C., the barium sulfate has an average particle size ($d_{50}$), determined by laser diffraction granulometry, of 8 µm.

As may be seen in the scanning-electron micrograph in FIG. 2, the barium sulfate particles are lamellar and exhibit a very smooth surface. The width of the particles varies between approximately 5 and 20 µm and the thickness between 0.5 and 1 µm. The ratio of width to thickness is 5:1 to 40:1.

SECOND EXAMPLE

Corresponding to the procedure described in the first Example, 3 l per hour of $Ba(OH)_2$ solution having an ion concentration of 0.3 $Ba^{2+}$ mol/l, at a temperature of 50° C., and 1.2 l per hour of dilute sulfuric acid having an ion concentration of 1.1 $SO_4^{2-}$ mol/l, at a temperature of 30° C., are introduced continuously and at constant volume into the tank (1). The precipitation is regulated in such a way that the pH value of the precipitating suspension is between 2 and 2.5. A barium sulfate having an average particle size $d_{50}$, measured by laser diffraction granulometry, of 11 µm is obtained at a precipitation temperature of 30° C. and a residence time of 57 min (FIG. 3). The lamellar barium sulfate particles have a width of 5 to 25 µm and a thickness of approximately 1 µm. The ratio of width to thickness is 5:1 to 25:1.

The invention claimed is:

1. Barium sulfate produced by a process wherein a barium salt solution and a sulfate solution are simultaneously and continuously brought together in equimolar quantities in a precipitating suspension at a temperature of 30 to 90° C., with constant stirring to produce at least one of lamellar barium sulfate particles or needle-shaped barium sulfate particles, wherein the precipitating suspension is withdrawn continuously in a steady volume and the barium sulfate precipitate is filtered, washed and optionally dried, wherein the barium salt solution has a concentration of 0.1 to 0.8 $Ba^{2+}$ mol/L and the sulfate solution comprises sulfuric acid in a concentration of 0.1 to 2.0 $SO_4^{2-}$ mol/L and the flow rate and stirring speed are controlled, at a constant precipitation volume, in such a way chat a pH value of 1 to 9 is obtained in the precipitating suspension, wherein the lamellar particles are 1 to 50 µm wide, 1 to 50 µm long and 0.1 to 2 µm thick, and wherein the needle-shaped particles are 0.1 to 50 µm long and 0.1 to 2 µm thick, and wherein the ratio of length or width to the thickness is from 3:1 to 500:1.

2. A process for producing barium sulfate comprising a simultaneously and continuously bringing together barium salt solution and a sulfate solution in equimolar quantities in a precipitating suspension at a temperature of 30 to 90° C., with constant stirring;
    withdrawing the precipitating suspension continuously and in a steady volume;
    filtering the barium sulfate precipitate; and
    washing the filtered precipitate, wherein the barium salt solution has a concentration of 0.1 to 0.8 $Ba^{2+}$ mol/L and the sulfate solution comprises sulfuric acid solution in a concentration of 0.1 to 2.0 $SO_4^{2-}$ mol/L, and the flow rate and stirring speed are controlled, at a constant precipitation volume, in such a way that a pH value of 1 to 5 is obtained in the precipitating suspension and at least one of lamellar barium sulfate particles or needle-shaped barium sulfate particles are produced, wherein the lamellar barium sulfate particles are 1 to 50 µm wide, 1 to 50 µm long and 0.1 to 2 µm thick and the needle-shaped particles are 0.1 to 50 µm long and 0.1 to 2 µm thick, the ratio of length or width to the thickness being 3:1 to 500:1 wherein the process is continuous.

3. The process of claim 2, wherein after the barium sulfate is worked the barium sulfate in the precipitation suspension is treated with at least one aftertreatment selected from the group consisting of an organic aftertreatment and an inorganic aftertreatment.

4. A process according to claim 2, wherein the sulfate solution is metered onto the surface of the precipitating suspension.

5. A process according to claim 2, wherein the sulfate solution is metered onto the surface of the precipitating suspension while the barium salt solution is introduced slightly above a base of the tank.

6. Barium sulfate of claim 1, wherein the barium sulfate particles are lamellar.

7. Barium sulfate of claim 1, wherein barium sulfate particles are needle-shaped.

8. A process according to claim 2, wherein the barium sulfate particles are lamellar.

9. A process according to claim 2, wherein the barium sulfate particles are needle-shaped.

* * * * *